United States Patent [19]
Langston et al.

[11] Patent Number: 6,114,833
[45] Date of Patent: Sep. 5, 2000

[54] MONITORING AND CONTROLLING SYSTEM FOR BATTERY AND BATTERY CHARGER

[75] Inventors: Charles R. Langston; James J. Dean; Ronald E. Long; Richard D. Hartz; James L. Carrier; Jerom James Jesse; Mark T. Bauer; Michael L. Schukar, all of Lincoln, Nebr.

[73] Assignee: Lester Electrical of Nebraska, Inc., Lincoln, Nebr.

[21] Appl. No.: 08/936,330

[22] Filed: Sep. 24, 1997

Related U.S. Application Data

[63] Continuation of application No. 08/421,990, Apr. 14, 1995, abandoned.

[51] Int. Cl.[7] .................................................. H02J 1/00
[52] U.S. Cl. ............................ 320/109; 320/107; 320/61
[58] Field of Search .......................... 320/48, 49, 54–55, 320/47, 43, 61, 40, 42, 33, 34, 38, 2, 109, 107, 104, DIG. 21, DIG. 18

[56] References Cited

U.S. PATENT DOCUMENTS

| | | |
|---|---|---|
| 3,564,382 | 2/1971 | King et al. . |
| 3,652,917 | 3/1972 | Biggs . |
| 3,735,234 | 5/1973 | Godard . |
| 3,740,636 | 6/1973 | Hogrefe et al. . |
| 3,748,567 | 7/1973 | Arai et al. . |
| 3,794,905 | 2/1974 | Long . |
| 3,809,978 | 5/1974 | Zubris ..................................... 318/139 |
| 3,904,947 | 9/1975 | Crews ..................................... 320/107 |
| 4,012,681 | 3/1977 | Finger . |
| 4,194,146 | 3/1980 | Patry . |
| 4,210,854 | 7/1980 | Godard . |
| 4,247,812 | 1/1981 | Patry et al. . |
| 4,288,734 | 9/1981 | Finger . |
| 4,387,334 | 6/1983 | Loper . |
| 4,479,080 | 10/1984 | Lambert ................................. 318/373 |
| 4,484,130 | 11/1984 | Lowndes et al. ...................... 320/17 X |
| 4,536,697 | 8/1985 | Johnston et al. ...................... 320/61 X |
| 4,626,750 | 12/1986 | Post . |
| 4,679,000 | 7/1987 | Clark . |
| 4,740,754 | 4/1988 | Finger . |
| 4,803,416 | 2/1989 | Abiven et al. . |
| 4,839,574 | 6/1989 | Takabayashi . |
| 4,912,392 | 3/1990 | Faulkner . |
| 5,043,651 | 8/1991 | Tamura . |
| 5,119,011 | 6/1992 | Lambert ................................ 320/48 X |
| 5,164,653 | 11/1992 | Reem . |
| 5,202,617 | 4/1993 | Nor ......................................... 320/109 |
| 5,206,097 | 4/1993 | Burns et al. .......................... 320/48 X |
| 5,281,955 | 1/1994 | Reich et al. . |
| 5,298,849 | 3/1994 | Drexel et al. . |
| 5,346,406 | 9/1994 | Hoffman et al. ........................ 439/474 |
| 5,487,002 | 1/1996 | Diller et al. .............................. 320/49 |
| 5,548,200 | 8/1996 | Nor et al. ................................ 320/109 |
| 5,659,240 | 8/1997 | King . |
| 5,670,853 | 9/1997 | Broell et al. . |

*Primary Examiner*—Peter S. Wong
*Assistant Examiner*—Pia Tibbits
*Attorney, Agent, or Firm*—Vincent L. Carney

[57] ABSTRACT

In operating a battery powered vehicle, a battery charger is located at a stationary location but the battery charger control circuit is mounted on the vehicle and powered from the DC battery of the vehicle. During a charging operation, a microprocessor within the battery charger control circuit detects that a charging operation is taking place and locks the vehicle in position and when the battery charger is disconnected, the battery charger is de-energized prior to disconnecting the electrical contact between it and the vehicle to avoid arcing. The microprocessor and its memory within the battery charger control circuit records information about the energy state of the battery and controls the battery both by measuring input and output power to the battery and by measuring the rate of change of charging current. It also controls operations such as trouble lights within the vehicle and may control a speed control circuit within the vehicle as well.

23 Claims, 10 Drawing Sheets

MONITORING AND CONTROLLING SYSTEM FOR BATTERY AND BATTERY CHARGER

This application is a continuation of application Ser. No. 08/421,990, filed Apr. 14, 1995.

BACKGROUND OF THE INVENTION

This invention relates to battery chargers and related systems for the operation of battery-operated vehicles. This invention especially relates to controllers for battery chargers which may be mounted either with the battery charger or on a battery-operated vehicle and may be separate or combined with circuitry for controlling the vehicle.

Some vehicles such as forklifts, golf cars and a variety of other large and small utilitarian vehicles such as electric lawn mowers, floor polishers and the like may include storage batteries as their main power source. Some battery-operated vehicles also use regenerative braking to feed power back to the battery in the battery-operated vehicles.

The prior art battery charger control systems and regenerative braking systems have several disadvantages, such as: (1) the regenerative braking systems have a tendency to damage batteries by applying energy at an unfavorable rate to the battery at times such as when the battery is close to being fully charged; (2) some of the systems which utilize the amount of energy removed from the battery to determine the time at which the battery must be charged, provide inefficient finish current levels for the battery and do not provide readily accessible long-term information which can be useful in monitoring the battery; (3) the battery charging connectors are subject to arcing; and (4) a source of AC (alternating current) power is necessary for the control system on some battery-operated vehicles.

SUMMARY OF THE INVENTION

Accordingly, it is an object of the invention to provide a novel battery charger and a battery-operated vehicle system.

It is a further object of the invention to provide a novel control arrangement for battery chargers.

It is a still further object of the invention to provide a novel system combining battery-operated vehicle control systems and battery charger systems.

It is a still further object of the invention to provide a novel regenerative braking system.

It is a still further object of the invention to provide a novel system for monitoring a battery long-term.

It is a still further object of the invention to provide a battery-operated vehicle operating system and battery charging system which permits the battery to have a longer life.

It is a still further object of the invention to provide a battery-operated vehicle and battery charging system which has lower operating costs, especially by reducing energy use.

In accordance with the above and further objects of the invention, a control circuit for a battery charger is mounted on a battery-operated vehicle and is powered by the direct current power from the battery. Control circuitry for operation of the vehicle may be on the same board as the control circuit, although in some embodiments, the control circuit for the vehicle may be separate from the control circuit for the battery and/or the control circuit for the battery may be off the vehicle. The battery charger in the preferred embodiment is not on the vehicle but the battery control circuit is on the vehicle.

The battery charger control circuit records ampere hours removed from the battery and ampere hours of energy applied to the battery to maintain a long-term record. The record of removed energy from the battery may be used to control power applied to the battery during operation of the vehicle by a regenerative braking system and may determine the timing for a battery charging and the turn off time for charging such as when energy slightly greater than that removed has been used from the battery. The measured energy removed and supplied may determine the termination point for the charge cycle within a predetermined range of energy being removed during a charging cycle, but on the other hand, a circuit which determines the cutoff time based on the rate of change of charging current may be used to provide an appropriate charging current rate or pattern to maintain the life of the battery.

The history of removal of energy and supplying energy may be utilized for other maintenance operations such as determining when the battery should be replaced and controlling watering or changing of electrolyte or the like. In a preferred embodiment, the charging history and other data may be monitored conveniently with a portable monitor which either plugs into the battery charger or, preferably, receives a transmitted radiant energy coded signal with the data. A microprocessor aids in the operation of the battery charger and may also aid in the control of the vehicle. It may also provide signals such as trouble signals or the like based on information received by the microprocessor and in some instances, stored in the microprocessor memory.

In embodiments in which the battery charger is not carried with the vehicle, a control circuit disconnects the source of battery charger power before the battery charger is disconnected from the battery to reduce arcing between different prongs of the plug used to connect the battery charger to the battery circuitry. In one embodiment, the battery charger is turned off by a prong in the plug that is shorter than the prongs for supplying power to the battery from the battery charger or by a different socket in the receptacle for the plug. The signal derived by the braking of the circuit in the prong that is shorter is utilized by the computer to disconnect the battery charger or turn the battery charger off to avoid arcing or high transients being supplied to the controlled circuitry or to cause arcing in the plug.

From the above description, it can be understood that the battery-operated vehicle, battery charger and control circuitry for the battery charger have several advantages, such as for example: (1) it provides a regenerative braking system that is less likely to damage a battery; (2) it permits automatic monitoring of a battery long-term; (3) it provides a battery-operated vehicle operating system and battery charging system which permits the battery to have a longer life; (4) it provides a battery-operated vehicle and battery charging system which has lower operating costs, particularly by reducing energy use; (5) it provides a battery-operated vehicle which has higher uphill speeds and better downhill speed control; (6) it permits monitoring of the battery by a portable remote monitor; (7) it reduces arcing when a battery is disconnected from a battery charger; and (8) it permits measurement of a battery's energy state with a portable monitor.

SUMMARY OF THE DRAWINGS

The above noted and other features of the invention will be better understood from the following detailed description when considered in reference to the accompanying drawings, in which.

DETAILED DESCRIPTION

Figure 1:
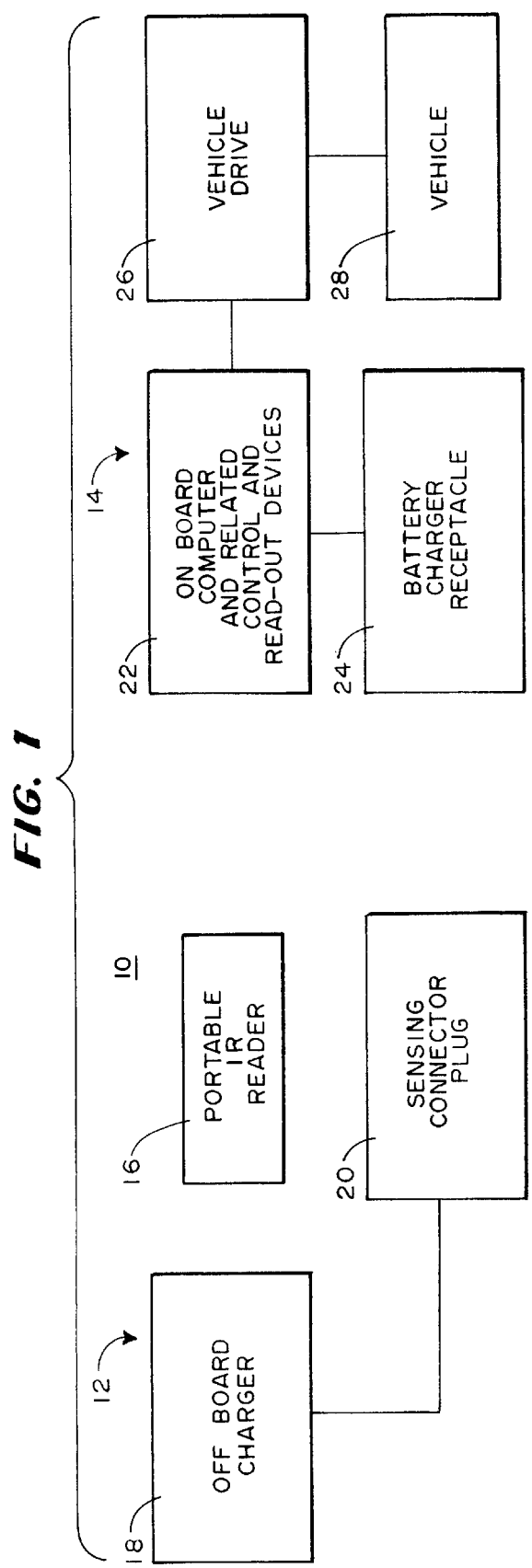
FIG. 1 is a block diagram of a battery-operated vehicle, a battery charger for the battery-operated vehicle and a monitor in accordance with an embodiment of the invention.

In FIG. 1, there is shown a block diagram of a combination 10 including a battery-operated vehicle, a battery charger control system and a monitoring system. This combination includes: (1) an off-board battery charging system 12; (2) a battery operated vehicle with an on-board battery charger control circuit; and (3) a portable infrared reader. The off-board battery charger system 12 includes an off-board charger 18 and a sensing connector plug 20 which are stationary in the preferred embodiment and not carried with the battery-operated vehicle 28. The battery-operated vehicle 28 and on-board units 14 and 24 include the vehicle itself 28 having a vehicle drive 26, an on-board computer and related control and read-out devices 22 and a battery charger receptacle 24 that cooperates with the sensing connector plug 20. A portable IR reader 16 may be used to read the state of the battery within the vehicle 28.

The sensing connector plug 20 is connected to the off-board charger 18 and is able to provide a signal to the on-board computer and related control and read-out devices 22 when it is connected to lock the vehicle drive 26 and to provide a signal to the on board computer and related control and read-out devices 22 as it is being disconnected to shut off the off-board charger 18 and thus terminates energy flow from the battery charger 18 to the vehicle before the sensing connector plug 20 is fully electrically disengaged from the batter charger receptacle 24 so that when the prongs connecting the sensing connector 20 to the battery charger receptacle 24 are disconnected, the power has also been disconnected. This is accomplished by having a signal prong in the plug that is longer or a signal connecting element in the receptacle that is shorter than the others so that a disconnect signal is provided for a signal while the power from the charger 18 is still being supplied. Thus, the charger may be turned off to avoid arcing between prongs of the plug.

The vehicle has a regenerative braking system such as are commonly used in electrical operated vehicles. In this system, when the brake is applied, the inertia from the vehicle results in driving a generator which supplies electrical power. The on-board computer and related control and read-out devices 22 includes a memory that monitors the energy state of the battery. If the battery energy is below a predetermined energy state, the power from regenerative braking is supplied to the battery and if it is above that level, it is dissipated under the control of the on-board computer and related control and read-out devices 22 in a resistance. Thus, if the battery is nearly charged, power is not supplied to it by regenerative braking or very little power is supplied so there is less likelihood of damage by supplying excess energy to the battery beyond its storage capacity or supplying the energy at a rate undesirable when the battery is at a nearly fully charged condition.

The on-board computer and related control and read-out devices 22 includes a microprocessor and microprocessor memory. A sensor senses current being supplied to the battery or being drained from the battery. This is converted to an energy value within the microprocessor and that value is stored. From these values, the energy state of the battery is calculated and this energy state may be encoded and trasmitted by infrared light to the portable IR reader 16. It may also be used under some circumstances, to terminate charging, although in other circumstances, charging is terminated by measuring the rate of change of charging current flowing from the battery charger to the battery so that termination is gradual after the current level has been reduced to avoid damage to the battery.

This latter type of termination is disclosed in U.S. Pat. No. 3,794,905 issued Feb. 26, 1974, in the name of Ronald E. Long and assigned to Lester Electrical Inc. The operation is performed as disclosed in this patent except that some of the operations are performed by a microprocessor in the embodiment of FIG. 1 rather than hand-wired individual discrete electrical units. The disclosure of U.S. Pat. No. 3,794,905 is incorporated herein by reference. The recorded history of the battery may also be used for other purposes such as for determining when the battery should be replaced or the like since it records data about the cycles of use.

Figure 2:
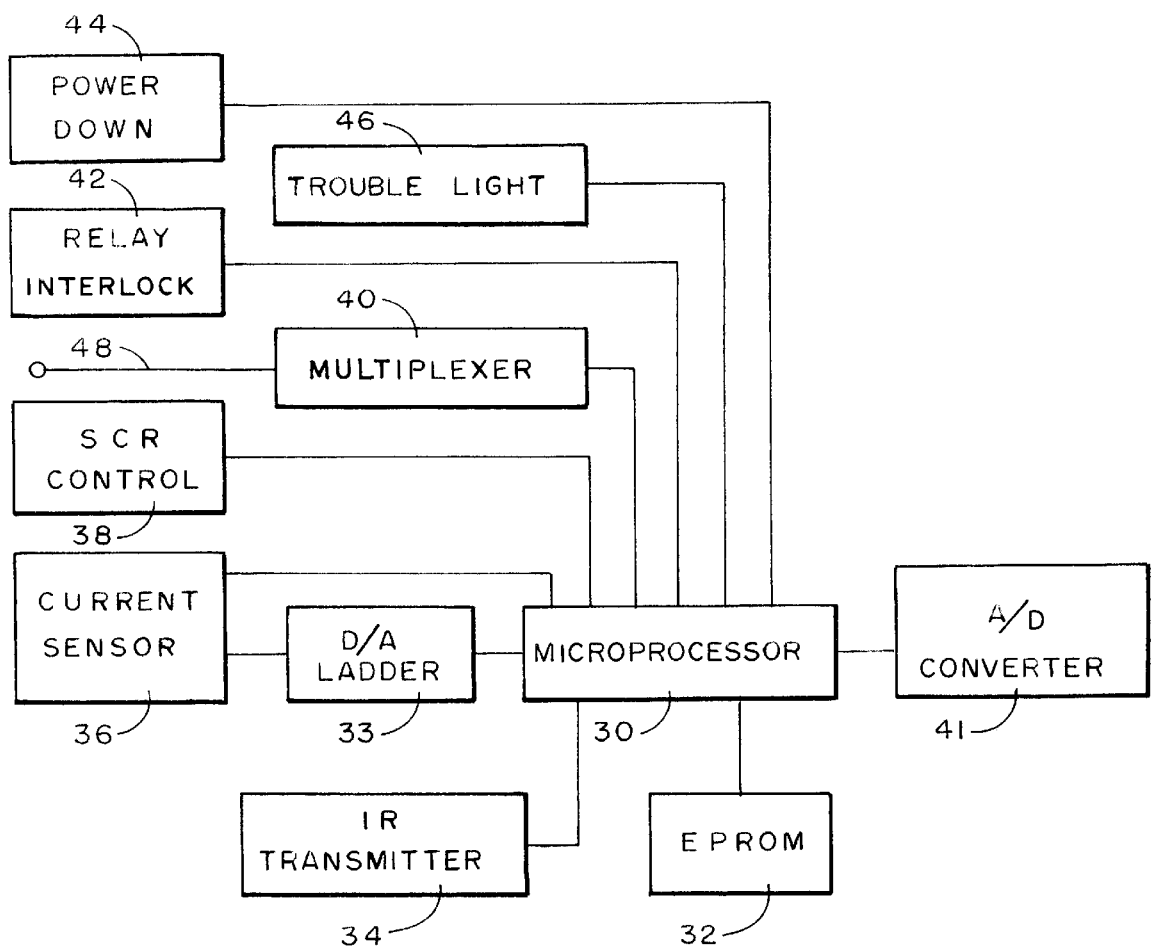
FIG. 2 is a block diagram of a control system for the battery charger in accordance with an embodiment of the invention.

In FIG. 2, there is shown a block diagram of the on-board computer and related control and read-out devices 22 having a microprocessor 30, a microprocessor memory 32, a digital-to-analog ladder 33, an infrared transmitter 34, a current sensor 36, a SCR control circuit 38, a multiplexor 40, a relay interlock 42, a power down circuit 44 and a trouble light circuit 46. The microprocessor 30 receives signals through the multiplexor 40 to both control the SCR control circuit 38 and to receive and transmit signals through a conductor 48 to motor control circuitry, if desired. The received signals are battery voltage, rate of change of battery charging current, on and off signals from the battery charger and AC ripple. The AC ripple indicates that AC power is being supplied to the battery charger. The microprocessor also stores information in the E PROM 32. That information may be received from current sensor 36 in digital form.

The current sensor 36 encodes signals into digital form and supplies them to the microprocessor to transmit information concerning current flow in and out of the battery to the microprocessor. The microprocessor utilizes this information to control the battery charger and to transmit information to the infrared transmitter 34 concerning the energy state of the battery. The E PROM 32 also stores a complete history of the battery that includes every cycle in which it drives a vehicle and every charge cycle for information.

The microprocessor also controls a trouble light 46 to indicate improper battery state and a power down circuit 44 which may save battery power by disconnecting the battery during nonuse and a relay interlock circuit 42 that locks the vehicle power drive during a charging operation. The current sensor 36 also aids in the SCR control 38 together with signals received from the microprocessor 30 through the multiplexor 40 in embodiments requiring the multiplexor.

Figure 3:
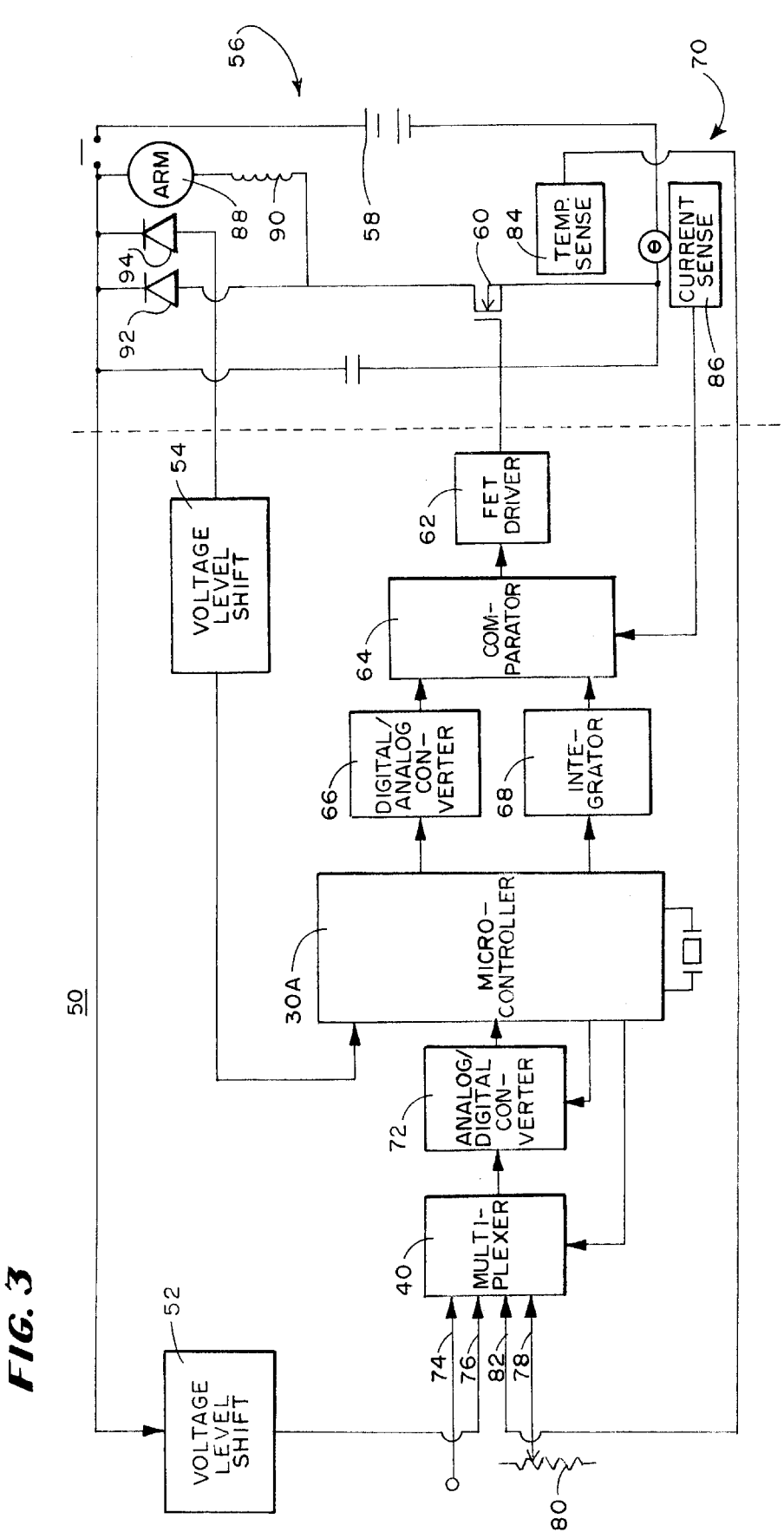
FIG. 3 is a block diagram of a battery charger control circuit and motor control circuit for a battery operated vehicle in accordance with an embodiment of the invention.

In FIG. 3, there is shown a block diagram of a battery charger control circuit and motor control circuit that are on a printed circuit board 50 which combines the control from the microprocessor 30A for both the speed of the vehicle, the battery charger and a regenerative switch 56 to, under some circumstances, cause energy from braking to be stored in the battery and in other cases, to permit it to be dissipated without supplying full energy to the battery. It is also possible to have other positions where partial amounts of the energy are supplied to the battery. While a battery charger control circuit and motor control circuit are on a single printed circuit board 50 in the preferred embodiment, they of course may be located on two separate printed circuits one for the battery charger control circuit and another for the motor control circuit.

The microprocessor 30 and 30A are CMOS single-chip eight-bit microcontrollers sold by Phillips Semiconductors Microcontroller Products under the product numbers 83C748/87C748 and 83C751/87C751. They may be obtained from United States Phillips Corporation, 811 East Arques Avenue, Sunnyvale, Calif. 94088-3409. Of course other microprocessors could be used.

The printed circuit board 50 in addition to including the microcontroller 30A, multiplexor 40 includes two voltage level shifters 52 and 54 which adjust the sensed voltage to a usable value, a motor 56, the battery 58, FET (field effect transistor) 60, FET driver 62, comparator 64, digital/analog converter 66, integrater 68, current sensing circuit 70 and analog/digital converter 72.

In this circuit, the multiplexor 40 multiplexes signals to the microcontroller 30A through the analog/digital converter 72 through a multiplexor 40 which receives a switch input signal on conductor 74, the battery voltage sensed signal, shifted by the voltage level shift 52 on conductor 76, a throttle input on conductor 78 from the potentiometer 80 controlled by a foot pedal in the electric vehicle 28 (FIG. 1) and a temperature value on conductor 82 received from a temperature sensor 84. The current sensor 86 supplies signals to the comparator 64 to provide an override of the comparator 64 at a predetermined current limit in the comparator 62. The integrater 60 generates a ramp under the control of the microcontroller 30A which is compared in the comparator 62 with the digital/analog converter output from the digital/analog 66 as controlled by the microprocessor 30A to activate FET driver 62 and FET 60 to control the pulse width provided by the FET unit 60. These units are actually a plurality of parallel connected units that supply adequate power to the motor 56. The motor 56 includes an armature 88 in series connected field 90 together with a free wheeling diode 92 and a plug diode 94 of a conventional nature. A compacitor 96 stores charge and acts as a filter compacitor.

Figure 4:
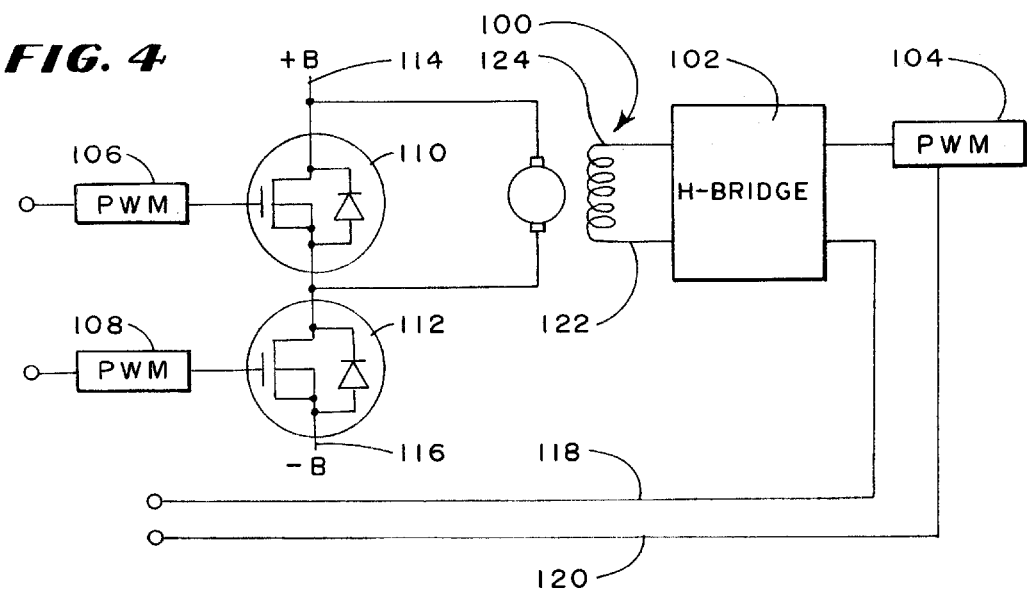
FIG. 4 is a schematic diagram of a regenerative braking system.

In FIG. 4, there is shown a schematic diagram of a motor arrangement used in conjunction with the control system of FIG. 3 when regenerative braking is to be included instead of the series field winding shown in FIG. 3. As shown in this view, a parallel connected motor 100 has its field winding electrically connected to the H bridge 102 which in turn is connected to a source of pulse width modulated pulses 104, conductor 118 indicating the direction as controlled by the bridge 102 for the flow of current and to conductor 120 that controls the field duty cycle through the pulse width modulator 104. The direction signal on conductor 118 causes the current to flow in a direction to drive the motor 100 or in the opposite direction to apply current to the battery.

During the regeneration cycle, the regenerative duty cycle pulse width modulator 106 supplies signals to FET 110 and the pulse width switch for the duty cycle control is connected to the FET 112 with the motor armature 100 being connected across the FET 110 and in series with the FET 112. Terminal 114 is electrically connected to the positive terminal of the battery and terminal 116 is electrically connected to the negative terminal of the battery.

Figure 5:
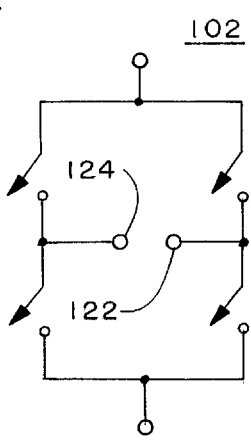
FIG. 5 is a schematic diagram of an H switch used in the system of FIG. 4.

In FIG. 5, there is shown a schematic circuit diagram of the H switch 102 illustrating the manner in which switches A can be closed to cause current to flow in one direction through the field connected across terminals 124 and 122 or the switch B closed and the switch A open to cause current to flow in the opposite direction through the field coil connected to terminals 122 and 124.

Figure 6:
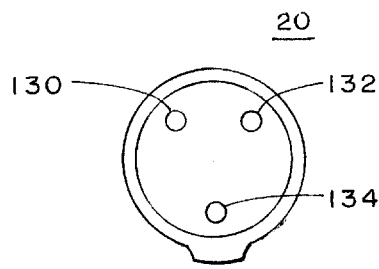
FIG. 6 is a plan view of a plug utilized in connecting the battery charger to the battery and battery control system in accordance with an embodiment of the invention.

In FIG. 6, there is shown a plan view of the plug 20 having a prong 130 for connecting to the positive terminal of the power supply, a prong 132 for connecting to the negative terminal of the battery charger and a prong 134 to supply a control signal from any source of power to the control circuit for the battery charger to indicate a charging operation has started or ended.

Figure 7:
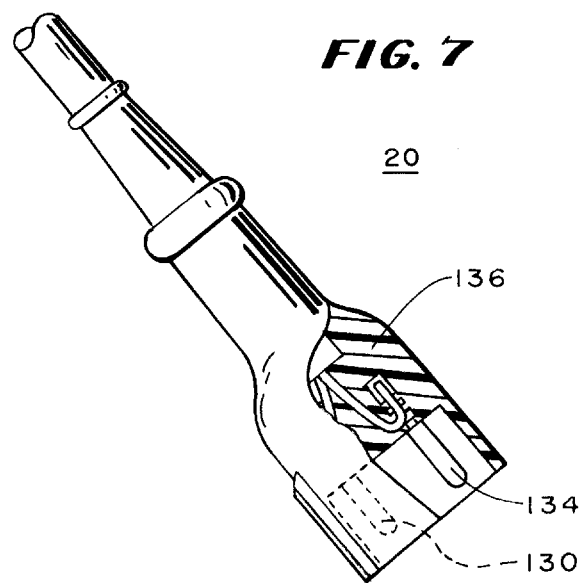
FIG. 7 is a fragmentary plan view of the plug of FIG. 6.

As shown in FIG. 7, the prong 134 for supplying a signal received through conductor 136 from the battery charger circuit is longer than the prong 130 and longer than the prong 132 so that the prong 134 supplies a signal to the vehicle when it is connected and a brake signal when disconnected for control purposes.

Figure 8:
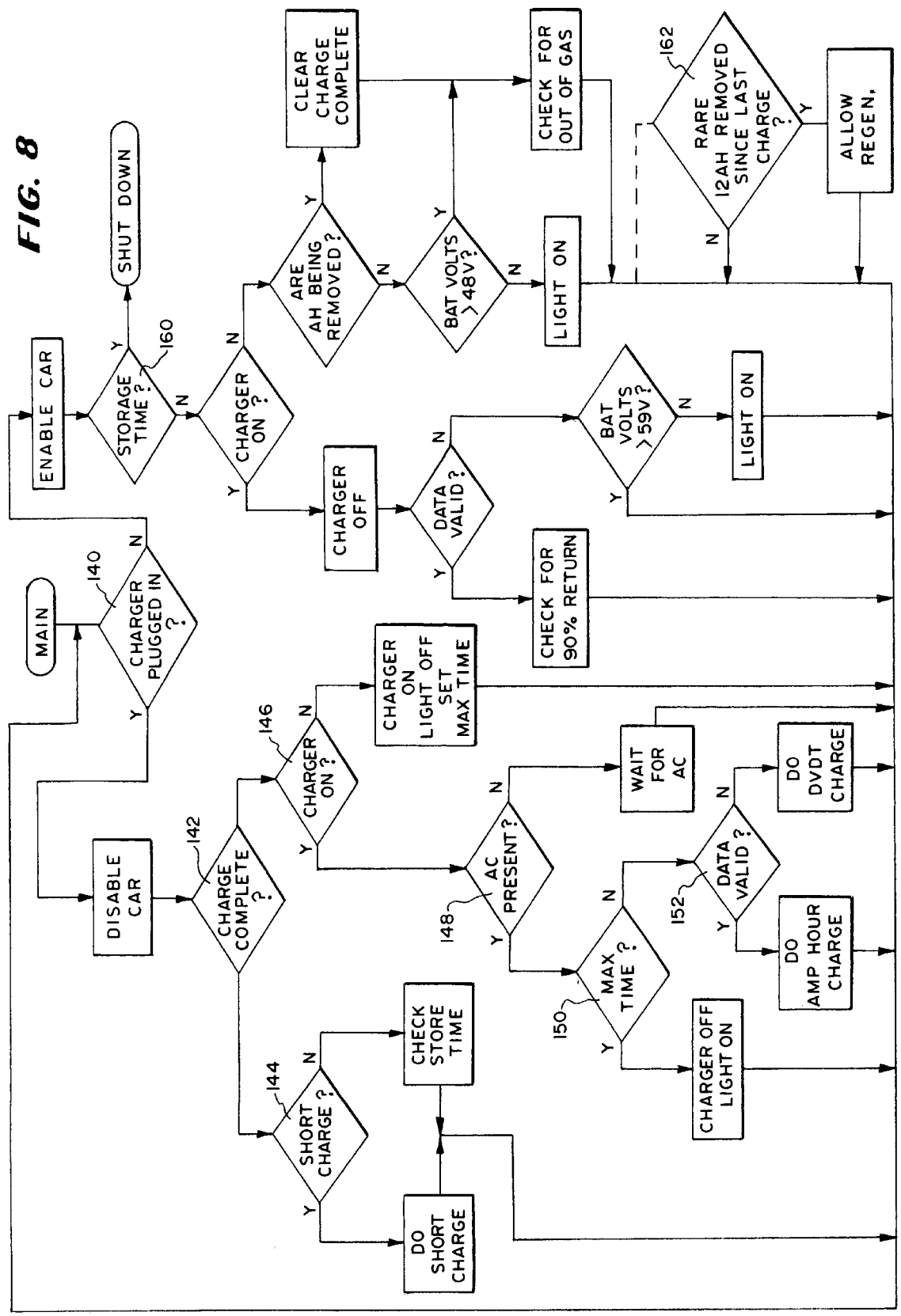
FIG. 8 is a flow diagram of a program utilized in controlling the battery charger.

In FIG. 8, there is shown a flow diagram of a program by microprocessor 30 or 30A to control the battery charger showing a decision as to whether the battery charger has been plugged in at 140 resulting in a series of steps indicating if it has been plugged in. If it has been plugged in, the car is disabled until the charge is complete as shown by decision 142. When complete, the short charge time period results in a feedback to check the plug again and if not, a checking of the time stored by the microprocessor in memory. If the charge is not complete, then a decision is made to check the charger shown at 146. The check is made as shown by the decision block 148 which detects an AC ripple. The AC ripple indicates that alternating current is being supplied to the charger whereas if only the battery voltage is being sensed, it will be DC rather than AC. If the AC is present, then a check is made as to whether the maximum time has been reached as shown by the decision block 150. A decision if the maximum time has not been reached is made at 152 to either check for the ampere-hours or check the rate of voltage change to determine if it is complete. If the charger is not on, the charger on light is turned off.

On the other hand, if the charger is not plugged in, the car in enabled. In that case, the amount of time stored is determined as shown at step 160 and if it is more than seven days, there is a shut down. If the charger is on, a check is made of the data and a check to determine if the battery voltage is greater than 59 volts. If it is not, the trouble light is turned on. If the charger is not on, a check is made to see if ampere-hours are being removed and if not, a check is made to determine if the battery voltage is greater than 48 volts. If ampere-hours are being removed, then the clear charge is complete and a check is made to determine if there is power in the battery. If at least 12 ampere-hours have been removed since the last charge, regeneration can be allowed as shown by decision block 162. This is done to be sure that energy is not applied to a fully charged battery. Of course, the test may be made at other values and a switch set such as shown in FIG. 4 to determine the amount of power to be dissipated or rather all of the power is to be sent to the battery. The number of field effect transistors 110 and 112 determines the amount of power to be dissipated and the H switch 102 channels the power, either to the storage battery or for dissipation.

Figure 9:
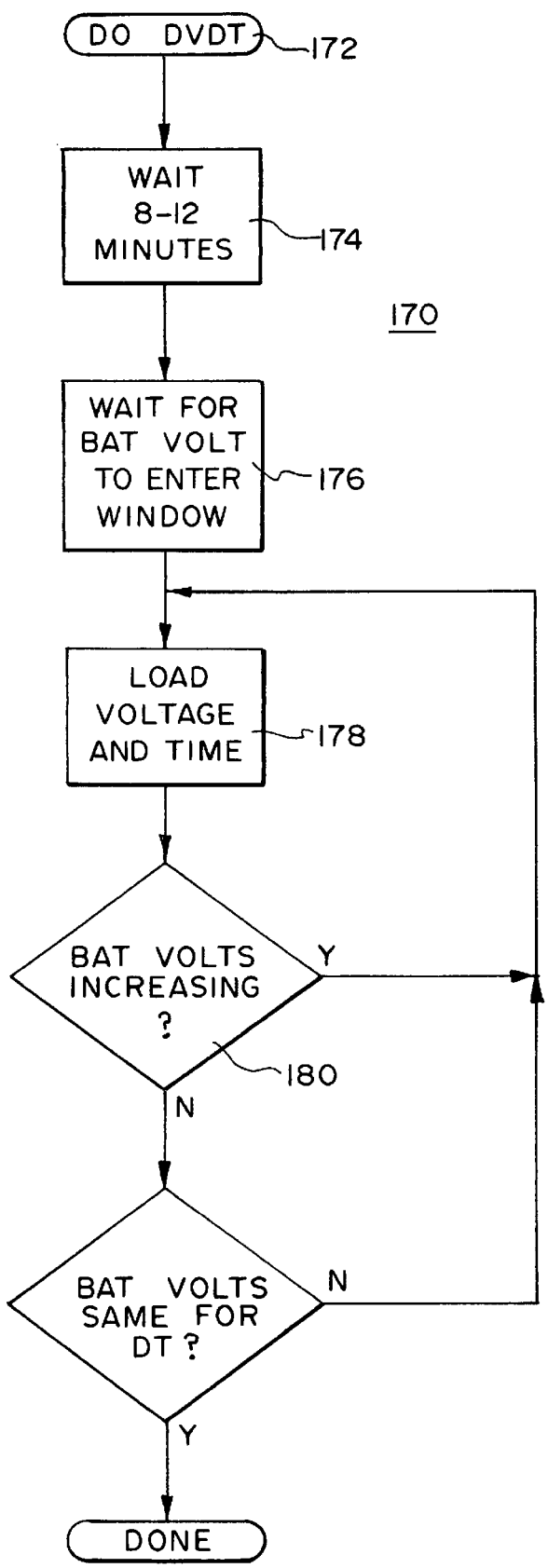
FIG. 9 is a flow diagram of one mode of operation of the battery charger control circuit.

In FIG. 9, there is shown a flow diagram of a finishing cycle for a battery to detect the rate of change and thus determine if the battery charger should be disconnected or not. As shown in this view, once a decision is made to control the termination of charge based on the rate of change of voltage of the battery at 172, the program 170 causes the system to wait as shown at step 174 for eight to twelve minutes. The program then waits for the battery voltage to enter the window as shown at step 126 and loads the voltage in time as shown at 178 into memory. If the battery voltage is increasing as indicated by the decision step 180, then the program recycles. If not, it checks to see if the battery voltage is the same. If not, it again recylces but if it is, the charge is terminated by inactivating the battery charger.

Figure 10:
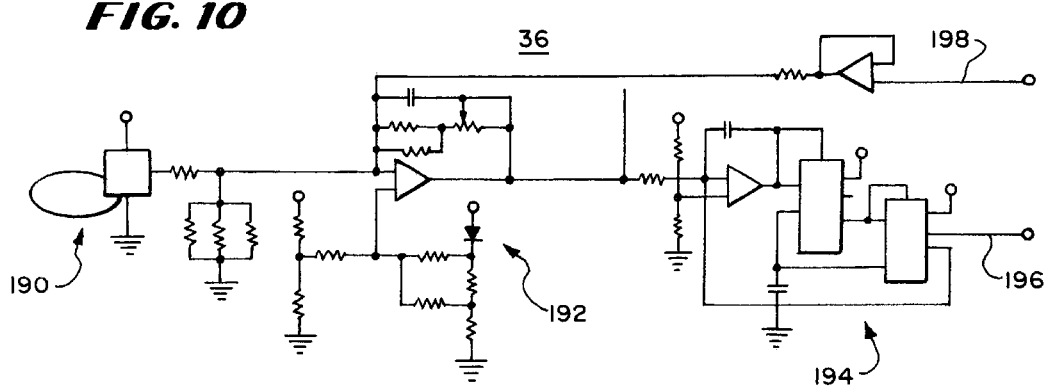
FIG. 10 is a schematic circuit diagram of a current measuring system used in the embodiment of FIG. 1.

In FIG. 10, there is shown a schematic circuit diagram of the current sensor 36 including a hall effect sensor 190, a temperature compensation and filtering circuit 192 and a current digitizing circuit 194. The digitizer circuit supplies digital signal to the microprocessor on conductor 196 and receives signals from the microprocessor on conductor 198.

Figure 11:
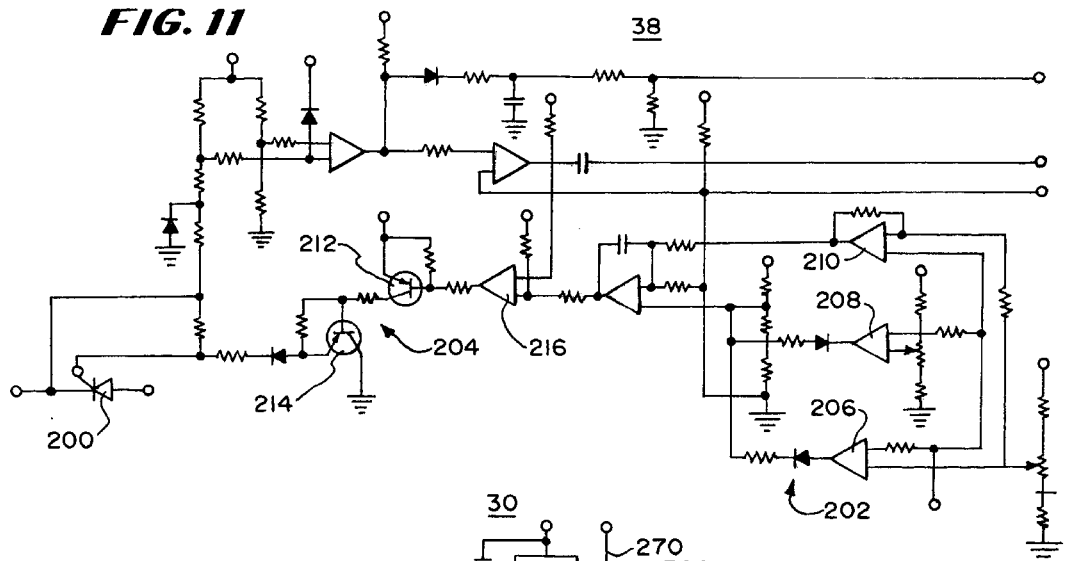
FIG. 11 is a schematic circuit diagram of a control system for controlling the current applied to a battery in accordance with the embodiment of FIG. 1.

In FIG. 11, there is shown a schematic circuit diagram of the control circuit 38 for controlling SCR 200 which in turn controls the turning on and off of the power supplied to the battery. Control amplifier array 202 controls the transistor circuit 204 to control the gate of the SCR as to turn on time and turn off time. In the circuit 202, the three amplifiers 206, 208, and 210 respectively control the charging curve with the amplifier 206 setting the start limit, the amplifier 208 controlling the finish amplifier and the amplifier 210 setting the start current. The actual turn on and turn off time are controlled by transistors 212 and 214 with the transistor 212 being turned on by the output from the comparator 216 which compares the ramp voltage with the voltage from the amplifiers 206, 208 and 210 to turn on the transistor 212 which turns on the PMP transistor 214 to trigger the SCR 200.

Figure 12:
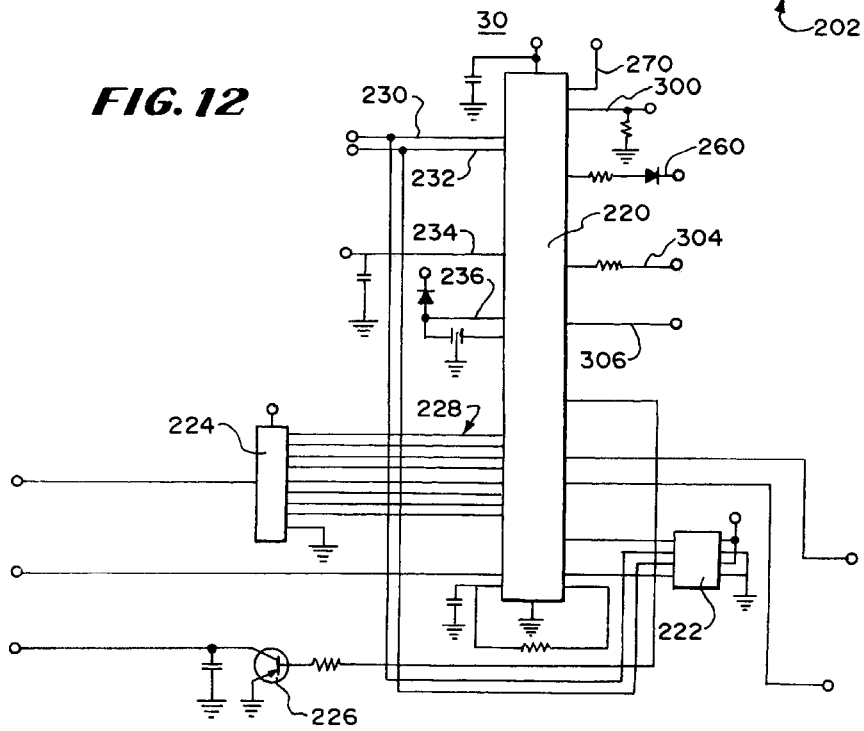
FIG. 12 is a schematic circuit diagram of a portion of the control board of FIG. 2.

In FIG. 12, there is shown a schematic circuit diagram of the microprocessor circuit 30 having a microprocessor 220, the E PROM memory 222, the SCR control transistor 226 and the digital-to-analog convertor 224. The digital-to-analog ladder convertor 224 is connected to the microprocessor 220 through the conductors 228 to generate a signal for zeroing the hall effect current sensor. The E PROM 222 stores information supplied to it by the microprocessor 220 such as the ampere-hours supplied and the ampere-hours removed from the battery. The multiplexor 40 (FIG. 2) multiplexes digitized signals for the battery voltage, the rate of change of current, the on and off status condition of the charger and the AC ripple signals through conductors 230, 232, 234 and 236. The microprocessor 220 utilizes this information to control the charging cycle of the battery.

Figure 13:
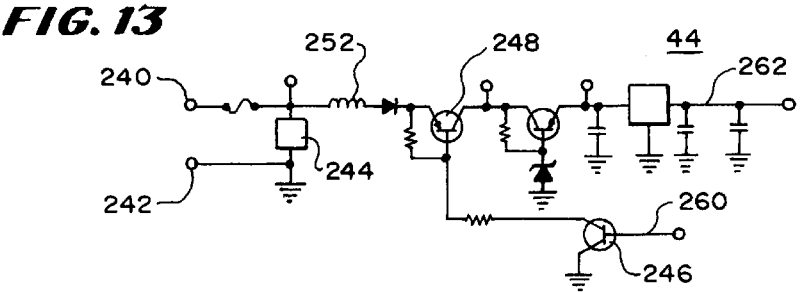
FIG. 13 is another portion of the circuit diagram of FIG. 2.

In FIG. 13, there is shown a schematic circuit diagram of the power down circuit 44 connected across the positive and negative battery terminals at 240 and 242. This circuit blocks transference of the voltage at 244 unless turned on. A signal turning it on is received at transistor 246 by a signal from the charger control sense conductor to 50 but turned off after seven days if there is no activity. When turned on, it turns transistor 248 on at its base to permit energization of solonoid coil 252 to activate the microprocessor.

Figure 14:
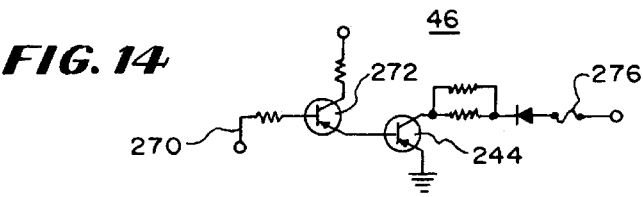
FIG. 14 is a schematic circuit diagram of still another portion of the block diagram of FIG. 2.

In FIG. 14, there is shown a schematic circuit diagram of the trouble light circuit which receives a signal on conductor 270, turning on transistor 272 and transistor 274 to initiate a trouble light signal at 276. This indicates a low battery voltage condition as determined by the microprocessor 220.

Figure 15:
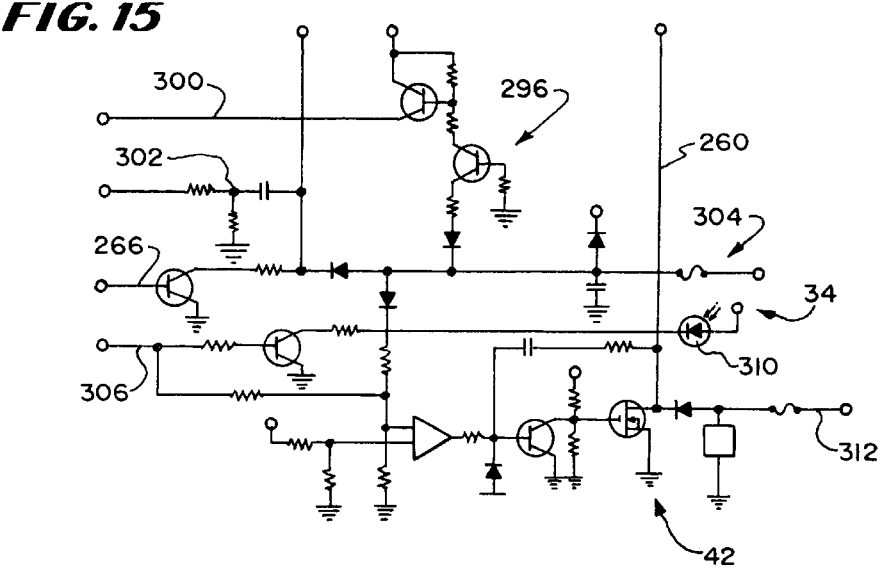
FIG. 15 is a schematic circuit diagram of still another portion of the block diagram of FIG. 2.

In FIG. 15, there is shown a circuit 296 for resetting the E PROM 222 (FIG. 12) triggered by a pulse on conductor 300 from the microprocessor, a circuit 294 for activating a charger control sensing mode to sense the battery current condition, and LED transmitting circuit 34 to transmit a code from the microprocessor 322 received on conductor 306 to the LED 310 for transmission to a sensing module and the drive circuit 42 for engaging a solonoid through conductor 312 to lock the vehicle.

Figure 16:
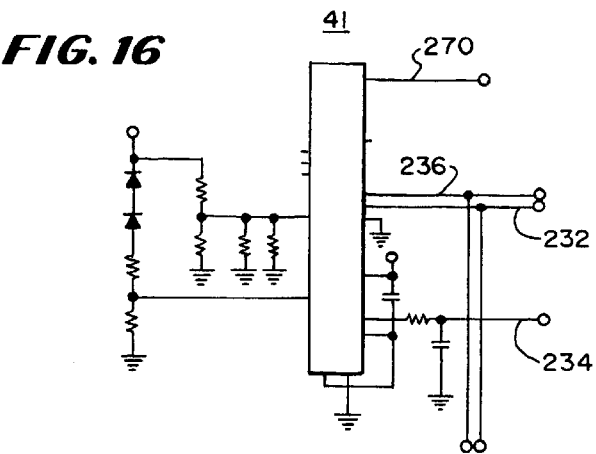
FIG. 16 is a schematic circuit diagram of still another portion of the embodiment of FIG. 2.

In FIG. 16, there is shown a schematic circuit diagram of the analog-to-digital convertor 41 electrically connected to conductor 270 to convert digital signals for transmission to the microprocessor 220.

Figure 17:
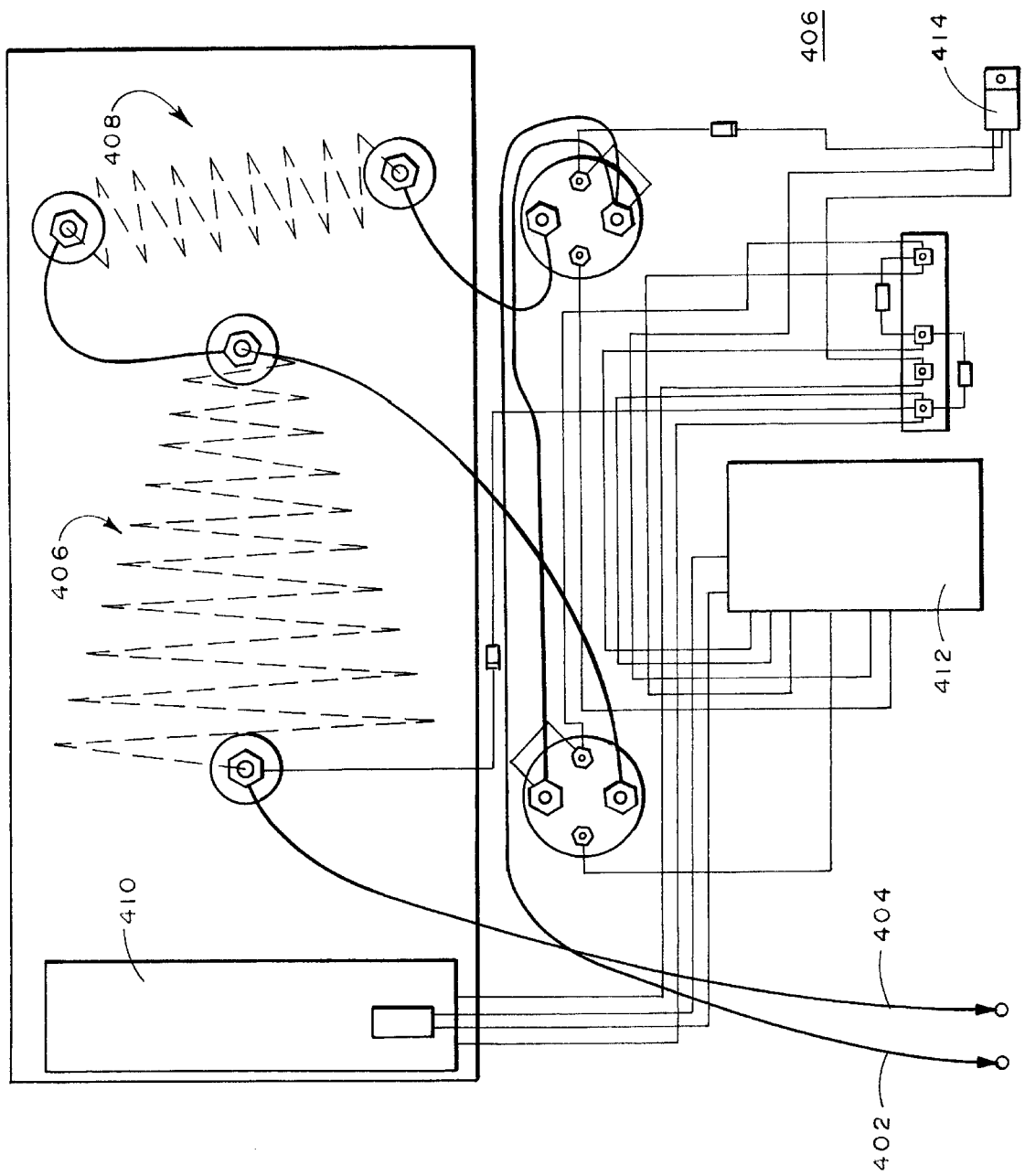
FIG. 17 is a schematic diagram of a discharge unit used in an embodiment of the invention.

In FIG. 17, there is shown a discharge unit 400 which may be electrically connected through conductors 402 and 404 to the positive and the negative terminals of the battery to discharge the battery through resistive coils 406 and 408. A fan 410 operates off of the DC source of potential within the electronic module 412. The power in the battery to which leads 402 and 404 is connected is controlled by the power transistor 414 as to discharge conditions to slowly discharge a battery while the fan operates at a 190 cubic feet per minute and should operate within the range of 100 cubic feet per minute to 120 cubic feet per minute. With this range, it is possible to cool the 75 amp, 0.48 ohm coil 406 and the 0.37 ohm coil 408 to discharge the battery. The power applied to conductors 402 and 404 may be measured to determine the energy capacity and potential of the battery.

Figure 18:
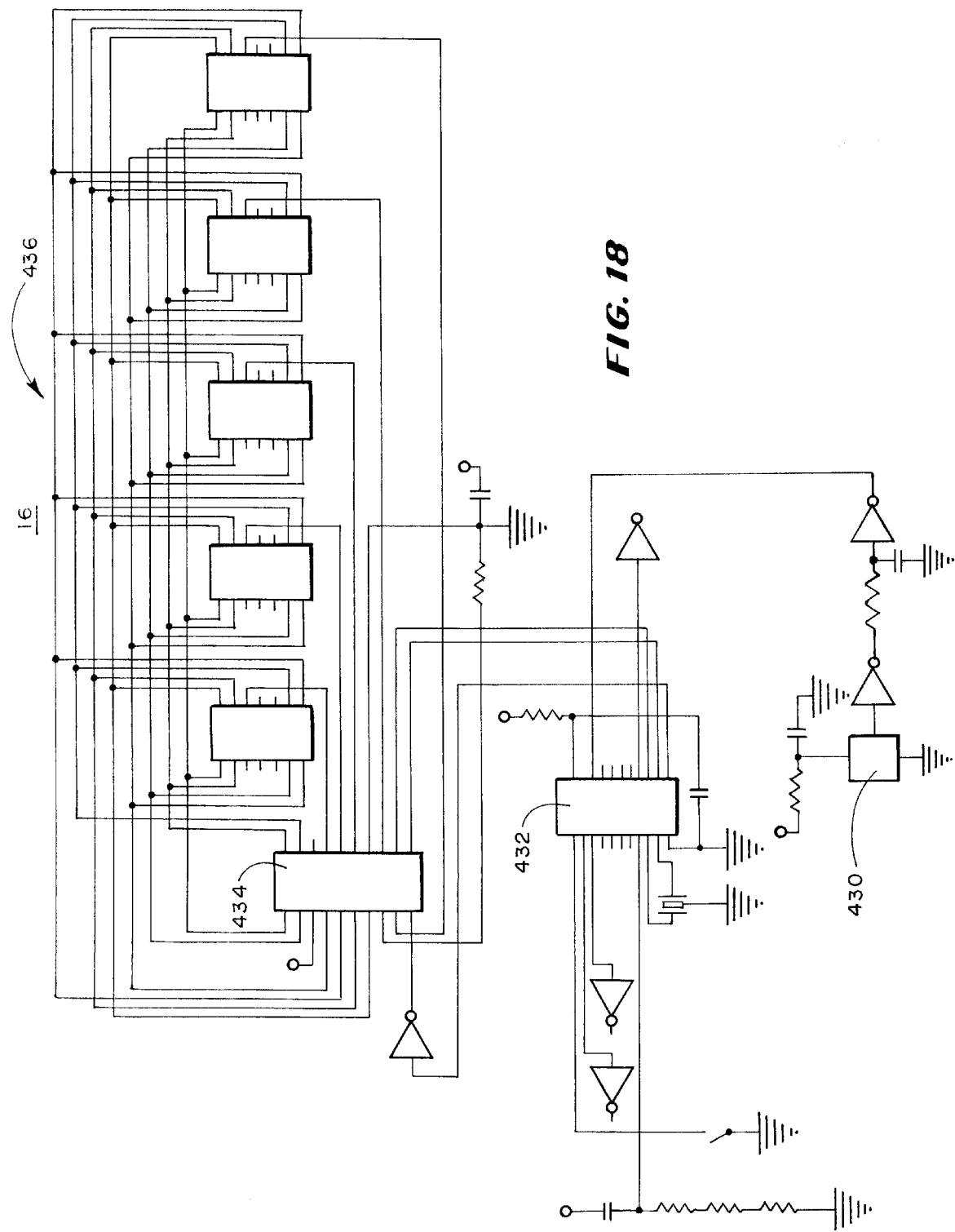
FIG. 18 is a diagram of a read-out monitor used in an embodiment of the invention.

In FIG. 18, there is shown a module for reading out the status of the battery from the microprocessor 30 and the IR transmitter 34 (FIG. 2) having an infrared sensor 430, a series to parallel encoder 432 connected to the sensor 430 for receiving signals and transmitting a bionary code to the storage register and driver 434 which drives the display units 436 to display a string of power values as determined by the module 432. With this arrangement, the hand-held monitor 16 may be located adjacent to the IR transmitter 34 to receive a code and transmit it from the sensor 430 as electrical pulses to the module 432 for encoding and transmission to the module-driver 434 to drive the LED display 436 in a manner known in the art. With this arrangement, a series of data as preprogrammed in the microprocessor may be transmitted to a hand-held monitor for reading of the information.

In operation, during a normal charge cycle, the battery voltage of 36 to 55 volts DC is detected on the third wire of the receptacle engaging the third prong 134 (FIGS. 6 and 7) of the sensing connector plug 22 (FIG. 1). After a two second to ten second delay, the charger relay is turned on and the battery system trouble light turned off. The amount of energy transmitted by the battery charger to the battery is approximately 110 percent of the energy units removed in the prior discharge cycle as recorded in the E PROM.

If the accumulated energy units are 110 percent of the energy units removed in the previous discharge cycle and the battery voltage is less than 58.8 volts, the finished charging is under the control of the measurement of the change of voltage with respect to time. The charger applies current for eight to twelve minutes before transferring to the rate of change of volt program. When the battery voltage exceeds 54 volts DC and stops increasing more than approximately 0.022 volts within a 45 minute time period, the charge cycle is terminated.

On the other hand, if the charge cycle lasts more than sixteen hours, the charger relay turns off the battery charger and the battery system trouble light is initiated. If the returned energy is greater than 90 percent of the energy units removed, the charger relay drive is turned off and the vehicle permitted to start by unlocking the relay interlock 42. If the returned energy units are less than 90 percent, the interlock 46 is turned off but the trouble light 46 is turned on for ten seconds.

From the above description, it can be understood that the battery-operated vehicle, battery charger and control circuitry for the battery charger have several advantages, such as for example: (1) it provides a regenerative braking system that is less likely to damage a battery; (2) it permits automatic monitoring of a battery longterm; (3) it provides a battery-operated vehicle operating system and battery charging system which permits the battery to have a longer life; (4) it provides a battery-operated vehicle and battery charging system which has lower operating costs, particularly by reducing energy use; (5) it provides a battery-operated vehicle which has higher uphill speeds and better downhill speed control; (6) it permits monitoring of the battery by a portable remote monitor; (7) it reduces arcing when a battery is disconnected from a battery charger; and (8) it permits measurements from a battery's energy state with a portable monitor.

Although a preferred embodiment of the invention has been described with some particularity, many modifications and variations in the invention are possible within the light of the above teachings. Therefore, it is to be understood that, within the scope of the appended claims, the invention may be practiced other than as specifically described.

What is claimed is:

1. A battery-operated vehicle comprising:
    a drive system;
    a battery for operating the drive system;
    battery charger control means;
    means for connecting a battery charger to at least one of the battery and the battery charger control means;
    circuit means for controlling the operation of the vehicle; and
    means for receiving power from the battery charger; said means for receiving power from the battery charger including means for terminating the flow of energy to the battery from the battery charger before the means for supplying energy to the battery is fully disconnected from at least one of the battery charger control means and the battery.

2. A battery-operated vehicle in accordance with claim 1 in which the battery charger control means and the circuit means for controlling the vehicle operation are mounted on a single printed circuit board for cooperative operation.

3. A battery-operated vehicle in accordance with claim 1 in which the battery charger control means and the circuit means are mounted separately on different printed circuit boards.

4. A battery-operated vehicle in accordance with claim 1 in which one microprocessor is operatively connected to the battery charger control means and the circuit means.

5. A battery-operated vehicle in accordance with claim 1 in which the battery charger control means includes means for measuring the amount of electrical energy removed from a battery and for measuring the amount of electrical energy added to the battery wherein the amount of charge in the battery may be determined.

6. A battery-operated vehicle in accordance with claim 1 in which the battery charger control means includes means for measuring the amount of energy added to the battery and the amount of energy removed from the battery wherein the state of charge of the battery may be determined and includes means for measuring the rate of change of charging the battery wherein the control of the rate of charging of the battery may be controlled under some circumstances.

7. A battery-operated vehicle according to claim 6 further including means for recording the energy of the battery.

8. A battery-operated vehicle in accordance with claim 1 in which the means for terminating the flow of energy to the battery includes a connector whereby the battery charger is connected to the vehicle; said connector including a plug and a receptacle with the plug and the receptacle having at least two connectors for applying energy between the battery charger and at least one of the battery charger control means and the battery and a third probe of a different size than a first and a second probe wherein the third probe is disconnected before the first and second probes are disconnected; the third probe being connected to computer means for terminating the flow of energy between the battery charger and the battery-operated vehicle before the first and second probes are disconnected.

9. A battery-operated vehicle in accordance with claim 1 in which the battery charger control means is powered by DC power from the battery within the battery-operated vehicle; which battery is also used to drive the vehicle.

10. A battery-operated vehicle according to claim 1 further including an interlock system, and means for causing the interlock system to lock a drive system of the vehicle when connector means between the battery charger and the vehicle is connected.

11. A battery-operated vehicle in accordance with claim 1 further including:
    means for generating a coded signal containing information about the condition of said battery; and
    means for transmitting said coded information by radiant energy to a portable monitor, wherein the status of the battery may be monitored with a remotely held portable monitor.

12. A method of operating a battery-operated vehicle comprising the steps of:
    driving a vehicle including a battery charger control circuit under the power of a battery;

periodically connecting one of the battery and the battery charger control circuit to a battery charger not on the vehicle; and receiving power from a battery charger; said step of receiving power from the battery charger including the steps of terminating the flow of energy to the battery from the battery charger before stopping the flow of energy to the battery.

13. A method in accordance with claim 12 wherein circuit means and the battery charger control circuit are operated by the same microprocessor.

14. A method in accordance with claim 13 further including the steps of:

measuring the amount of electrical energy removed from the battery;

measuring the amount of electrical energy added to the battery; and determining the amount of energy in the battery.

15. A method according to claim 13 further including the step of periodically monitoring the battery by reading a radiant energy code into a portable display.

16. A method in accordance with claim 12 further including the steps of measuring the amount of energy added to the battery and the amount of energy removed from the battery wherein the state of charge of the battery may be determined and measuring the rate of change of charging the battery wherein the control of the rate of charging of the battery may be controlled under some circumstances.

17. A method in accordance with claim 12 in which the step of terminating the flow of energy to the battery includes the step of connecting the battery charger to the vehicle; the step of disconnecting a third probe before a first and a second probe are disconnected; wherein the third probe is connected to computer means for terminating the flow of energy between the battery charger and the battery-operated vehicle before the first and second probes are disconnected.

18. A method in accordance with claim 12 wherein the battery charger control circuit is powererd by DC power from the battery within the battery-operated vehicle; and the battery is used to drive the vehicle.

19. A method according to claim 12 further including the step of causing an interlock system to lock a drive system when connector means between the battery charger and the vehicle is connected.

20. A method in accordance with claim 12 further including the steps of:

generating a coded signal containing information about the condition of said battery; and transmitting said coded information by radiant energy to a portable monitor, wherein the status of the battery may be monitored with a remotely held portable monitor.

21. A portable measuring device, comprising:

means for connecting the portable measuring device to a vehicle;

means operatively connected to means for connecting to a battery for dissipating energy from the battery at a controlled rate; and cooling means for cooling said means for dissipating energy;

said cooling means being battery driven wherein said portable measuring device may measure the amount of energy dissipated from the battery without overheating.

22. The combination of a portable monitor for batteries and a battery operated vehicle comprising:

a microprocessor mounted to said battery operated vehicle;

means for measuring and recording the condition of a battery on a battery powered vehicle;

said microprocessor including means for calculating the condition of the battery on the vehicle and encoding it;

a portable monitor, comprising means for receiving a coded signal containing information about the condition of a battery transmitted with an infrared radiated carrier from the vehicle; and means for translating said coded information transmitted by the infrared radiated carrier to displayed indications mounted in the portable monitor, wherein the status of the battery may be monitored with the portable monitor.

23. A battery-operated vehicle comprising:

a drive system;

a battery for operating the drive system;

battery charger control means;

means for connecting a battery charger to at least one of the battery and the battery charger control means; and circuit means for controlling the operation of the vehicle;

said battery charger being at a station separated from said vehicle and said battery charger control means being on said vehicle, wherein a plurality of vehicles may be served by one charger and a microprocessor may control both the circuit means and the battery charger control means; wherein the battery charger control means includes means for measuring the amount of energy added to the battery and the amount of energy removed from the battery wherein the state of charge of the battery may be determined and includes means for measuring the rate of change of charging the battery wherein the control of the rate of charging of the battery may be controlled under some circumstances.

* * * * *